United States Patent [19]

Helgesson

[11] 4,144,086

[45] Mar. 13, 1979

[54] ADDITIVE FOR CONCRETE

[75] Inventor: Claes I. Helgesson, Åkersberga, Sweden

[73] Assignee: AB Alfong Betonghardningsmedel, Stockholm, Sweden

[21] Appl. No.: 832,672

[22] Filed: Sep. 12, 1977

Related U.S. Application Data

[63] Continuation of Ser. No. 637,588, Dec. 4, 1975, abandoned.

[30] Foreign Application Priority Data

Dec. 23, 1974 [SE] Sweden .................. 7416250

[51] Int. Cl.$^2$ ............................................. C04B 31/30
[52] U.S. Cl. ................................... 106/315; 264/333
[58] Field of Search .................... 264/333; 106/85, 90, 106/97, 98, 315

[56] References Cited

U.S. PATENT DOCUMENTS

| | | | |
|---|---|---|---|
| 1,898,636 | 2/1933 | Linzell | 264/333 |
| 3,238,279 | 3/1966 | Tarlton et al. | 264/333 |
| 3,493,644 | 2/1970 | Owen | 264/333 |
| 3,522,068 | 7/1970 | Bastian et al. | 106/97 |
| 3,770,859 | 11/1973 | Bevan | 264/333 |

FOREIGN PATENT DOCUMENTS 1056621  1/1967  United Kingdom .............. 106/97

*Primary Examiner*—Donald J. Arnold
*Attorney, Agent, or Firm*—Toren, McGeady and Stanger

[57] ABSTRACT

Concrete products having a high strength after a short hardening time are manufactured by adding sodium sulphate to a conventional concrete mixture in a quantity of 0.1 – 5 per cent by weight of the cement. The concrete shall be kept at a temperature of 30°– 90° C. during the mixing process. The cast concrete shall be held at 30°– 90° C. for at least two hours.

1 Claim, No Drawings

ADDITIVE FOR CONCRETE

This is a continuation of application Ser. No. 637,588, filed Dec. 4, 1975, now abandoned.

The invention relates primarily to a method of manufacturing concrete products which have high strength after a short hardening time. By concrete is meant a composition prepared from filler material, primarily sand and stones, water and cement, preferably Portland cement, which may be of normal or quick-hardening type.

When casting concrete, both on building sites and when manufacturing prefabricated articles such as building elements, it is desirable to shorten the hardening time of the concrete. Efforts have been made to achieve this by adding various substances to the concrete, and by increasing the temperature of the concrete mix. However, these attempts have not been particularly successful since either the hardening has occurred so rapidly that the concrete has become stiff while still in the mixer, or the quality of the finished concrete has not been satisfactory.

According to the present invention it has now been found that the hardening time can be substantially reduced without any ill effects on the finished concrete. The hardening time is considered to mean the time which the concrete must remain in the casting mould, that is the time required until the concrete has become strong enough for the casting mould to be removed or in case of prestressed concrete, for the prestressing cables to be loosened. This strength may naturally vary depending on the circumstances during casting, but in general it is desired that the concrete shall have achieved a compressive strength of 100–250 kg/cm$^2$ before being removed from the mould, and 300–400 kg/cm$^2$ before relaxing the tension of prestressing cables.

The method according to the invention is characterized in that sodium sulphate is added to the concrete mix in a quantity of 0.1–5%, preferably 0.5–1.5%, of the weight of the cement, that the concrete mix is kept at a temperature of 30°–90° C. during the mixing process, and that the cast concrete is held at a temperature of 30°–90° C. for a period of at least two hours. The concrete mix should preferably be cast in a mould in such a manner that no noticeable decrease in temperature occurs during the casting process.

The quantity of sodium sulphate added is defined as crystaline sodium sulphate $Na_2SO_4.10H_2O$.

The favourable effect of the sodium sulphate appears to be achieved because, by increasing the ion activity in the water phase, it delays the hydration of the cement component $3CaO.Al_2O_3(C_3A)$. The workability of the concrete mixture is not noticeably reduced during the mixing process. This is quite contrary to what might be expected, because the workability of a pre-heated conventional concrete mixture (without sodium sulphate) is reduced during the mixing process. Hydration of the cement components $3CaO.SiO_2(C_3S)$ and $2CaO.SiO_2(C_2S)$ occurs more rapidly upon increased ion activity in the water phase, but since these reactions do not occur immediately after the addition of water, they do not cause any alteration in the workability of the concrete mix. When the hydration of $C_3S$ and $C_2S$ starts, the reaction occurs very quickly, producing heat and forming $Ca(OH)_2$. In order for this to take place the temperature may not be allowed to fall after the casting; otherwise the entire hardening process will be delayed.

The sodium sulphate is preferably added to the concrete mix towards the end of the mixing operation, when the other components have been thoroughly mixed. The elevated temperature is preferably achieved by pre-heating the components. Alternatively the mixer can be heated externally, or steam can be blown into the mixer. In the latter case the water added by condensation of the steam has to be taken into account.

When concrete is being cast in a mould it is advisable that the mould has been pre-heated to at least the same temperature as the concrete mix, to avoid retardation of the hardening process as mentioned above. Once the concrete has been cast, its temperature will gradually increase spontaneously due to the heat formed by the hydration. If the temperature increase is not sufficiently rapid, or not sufficiently high for the desired temperature range of 30°–90° C. to be achieved, the cast concrete can be heated by steam, for example. It is preferred to prevent water from evaporating from any concrete surface exposed to the air. This can be done in a known way by spraying water onto such exposed concrete surfaces, or by covering them with a plastic foil. If a large quantity of concrete is being cast, the temperature inside the concrete may become too high. In this case the concrete may be cooled in known manner, for instance by means of cooling tubes embedded therein.

It can therefore be said that the sodium sulphate delays the hydration during the initial stage, i.e., during the mixing process, and accelerates the hydration during a later stage when the concrete has been cast. The spontaneous or artifically induced temperature increase during this latter stage involves a certain risk of the concrete shrinking and drying out so that cracks are formed. It has been found that this risk can be reduced or eliminated by also adding fine-particled, reactive amorphous silica, $SiO_2$. This silica should preferably have a particle size corresponding to that in a colloidal solution, where the particle size is generally less than 30 nm (nanometers). Such colloidal silica can be produced, for example by precipitation from a silicate solution. The addition of such colloidal silica should be of approximately the same quantity as the addition of sodium sulphate, i.e., 0.05–3.0 percent of the weight of the cement. Silica having coarser particles may also be used, for example silica which has been extracted from exhaust gases from various pyrometallurgical processes. The particle size of such silica may be as much as 10 $\mu$m. Larger quantities of this type of silica should be used than of the colloidal silica, preferably 0.3–6 percent of the weight of the cement.

The favourable effect of the silica appears to be due to the reaction of the silica with the calcium hydroxide formed upon hydration of the cement components mentioned above. This reaction is useful for two reasons. Firstly a portion of the calcium hydroxide is consumed, thus inducing increased hydration, and secondly calcium silicate hydrates are formed, said hydrates increasing the strength of the concrete, thus preventing cracks.

It has also been found useful to add a wetting agent to the concrete mix. This gives much more thorough wetting throughout the mixture as well as better distribution of the finer cement particles, and also of the silica, if such is added. The quantity of wetting agent added is preferably 0.0002–1 percent of the weight of the cement. It is preferred to use a so-called lyotrope liquid crystal as wetting agent, since this stabilizes a suspension of fine particles considerably better than a wetting agent which is not a lyotrope liquid crystal.

The invention also relates to an additive for concrete, intended to enable mixing, casting and hardening at elevated temperatures. The additive is characterized in that it consists of a substantially saturated water solution of sodium sulphate, in which fine-particled silica is suspended in a quantity of 10–70 percent of the total weight of the additive. The additive also preferably contains a wetting agent in a quantity of 0.002–2 percent of the total weight, in order to keep the silica in relatively stable suspension. The wetting agent also has the useful effect mentioned above in the concrete mix.

EXAMPLE 1

Concrete was mixed under the conditions stated below.

| Concrete mixture: | |
| --- | --- |
| Cement (Gullhögen's quick-hardening cement) | 24 kg |
| Gravel 0–8 mm | 34.75 kg |
| Macadam 8–16 mm | 13.10 kg |
| 16–23 mm | 39.25 kg |
| Water-cement ratio | 0.42 |
| Mixing temperature | 40° C |

This concrete mixture was divided into three batches. Sodium sulphate was added as disclosed below.
Batch No. 1: No addition
Batch No. 2: 1.1 percent by weight of cement
Batch No. 3: 5 percent by weight of cement.

The consistency of these three batches was measured with a so-called slump cone (German: Setzmessgerät). The result is given in centimeters. The consistency was also measured with a so-called vebe consistency meter (German: Vebe-Konsistenzmessgerät). The result is given in seconds. The results of these measurings are given in the table below:

| | Batch 1 | Batch 2 | Batch 3 |
| --- | --- | --- | --- |
| Slump cone consistency: | | | |
| Immediately after mixing | 5 | — | — |
| After 15 minutes | 0 | 6 | 8 |
| After 35 minutes | 0 | 2 | 4 |
| Vebe consistency: | | | |
| Immediately after mixing | 2 | — | — |
| After 15 minutes | not measured | 2 | 1 |
| After 35 minutes | 20 | 7 | 5 |

Test bodies were prepared from the three batches. The test bodies were hardened in a curing chamber, in which the temperature was increased in this way:

| Time, hours | Temperature |
| --- | --- |
| 0 | 40° C |
| 1 | 50° C |
| 2 | 57° C |
| 3 | 62° C |
| 4 | 65° C |

The compressive strength of said test bodies was examined after 2, 3 and 4 hours.

The results are given in the table below. The strength is given as kg/cm$^2$, and each figure given is the average values for two test bodies.

| | After 2 hours | After 3 hours | After 4 hours |
| --- | --- | --- | --- |
| Batch 1 | 91 | 236 | 293 |
| Batch 2 | 112 | 244 | 300 |
| Batch 3 | 169 | 293 | 321 |

Batch No. 1 is not useful for practical use, because the concrete solidified too rapidly. Batch No. 2 is superior, first because the hardening was delayed so that the concrete could be mixed and cast while still in the plastic state, and secondly because the compressive strength is higher than that of batch No. 1. These useful results are still more pronounced in batch No. 3, having the highest addition of sodium sulphate.

EXAMPLE 2

An additive was manufactured containing in 1 kg:
551.0 g water
212.1 g sodium sulphate, $Na_2SO_4.10H_2O$
236.2 g colloidal silica
0.7 g nonyl phenyl polyoxyethylene monoglycolether (Berol 02).

The sodium sulphate was dissolved in the water and the wetting agent was then added. When the mixture had equalized, the silica was stirred in.

EXAMPLE 3

Concrete was mixed under the conditions given below. Test bodies were cast from the concrete mix and stored in a steam box at the stated temperature and humidity. Two test bodies were taken out after specified periods and their compressive strength was determined. After 4 hours the remaining test bodies were transferred to a curing chamber for hardening in accordance with the stipulated standardized method (so-called combined curing).

| Concrete mixture | |
| --- | --- |
| Cement (Gullhögen's quick-hardening cement) | 26 kg |
| Gravel 0–8 mm | 35.2 kg |
| Macadam 8–12 mm | 48.5 kg |
| Water temperature | 70° C |
| Concrete temperature | 33° C |
| Water-cement ratio | 0.43–0.44 |
| Vebe consistency | not measured |
| Additive | 0.78 kg (3.0 per cent of cement weight) of the additive according to Example 2. |
| Curing | 65° C, 100% rel. humidity. |

| Compressive strength (kg/cm$^2$) | Test body No. 1 | Test body No. 2 | Average |
| --- | --- | --- | --- |
| 2 hours after casting | 360 | 338 | 349 |
| 3 hours after casting | 396 | 407 | 401.9 |
| 4 hours after casting | 422 | 429 | 425.5 |
| After combined curing for 24 hours | 444 | 453 | 448.5 |

EXAMPLE 4

The same conditions as in Example 3 but without any additive. The concrete mix was impossible to cast since it started solidifying during the mixing process.

EXAMPLE 5

Concrete was mixed under the conditions stated below. Test bodies were cast from the concrete mix. The test bodies were cured in a heating chamber at the temperature stated. After 2, 3, 4, 5, 6 and 24 hours the test bodies were pressure tested. The increase in strength is given in the Table below:

TABLE

| Concrete mixture | |
|---|---|
| Cement (Gullhögen's quick-hardening cement | 19.0 kg |
| Gravel 0-8 mm | 33.6 kg |
| Macadam  8-16 mm | 18.7 kg |
| 16-22 mm | 18.7 kg |
| Mixing temperature | 55° C |
| Water-cement ratio | 0.43 |
| Vebe consistency | 3.0 seconds |
| Additive: | 0.88 kg (4.6 per cent of cement weight) of the additive according to Example 2. |
| Hardening 0-2 hours | Approximately 75° C. Thereafter adiabatic hardening, the temperature being approximately 75° C. for about 2 hours and then decreasing to 45° C. after a total of 19 hours, after which the test bodies were removed from the heating chamber and hardened at 20° C. |

| Curing time (hours) | Compressive strength (kg/cm$^2$) |
|---|---|
| 1 | 20 |
| 2 | 160 |
| 3 | 320 |
| 4 | 384 |
| 5 | 410 |
| 6 | 420 |
| 12 | 450 |
| 24 | 504 |

EXAMPLE 6

The same conditions as in Example 5 but with no additive. The concrete mix was impossible to cast since it solidified during the mixing process.

What is claimed is:

1. An additive for concrete consisting essentially of a substantially saturated aqueous solution of sodium sulfate having suspended therein 10 to 70% by weight of the total weight of the additive of fine silica particles and 0.002 to 2% by weight of the total weight of the additive of a wetting agent consisting of a lyotropic liquid crystal.

* * * * *